Sept. 11, 1956
J. N. WHITAKER
SWINGABLE REDWOOD-BARK-PEELING CHISEL
HAVING PEELED-LOG-CONTACTING GUIDE
Original Filed Sept. 27, 1952
Re. 24,215
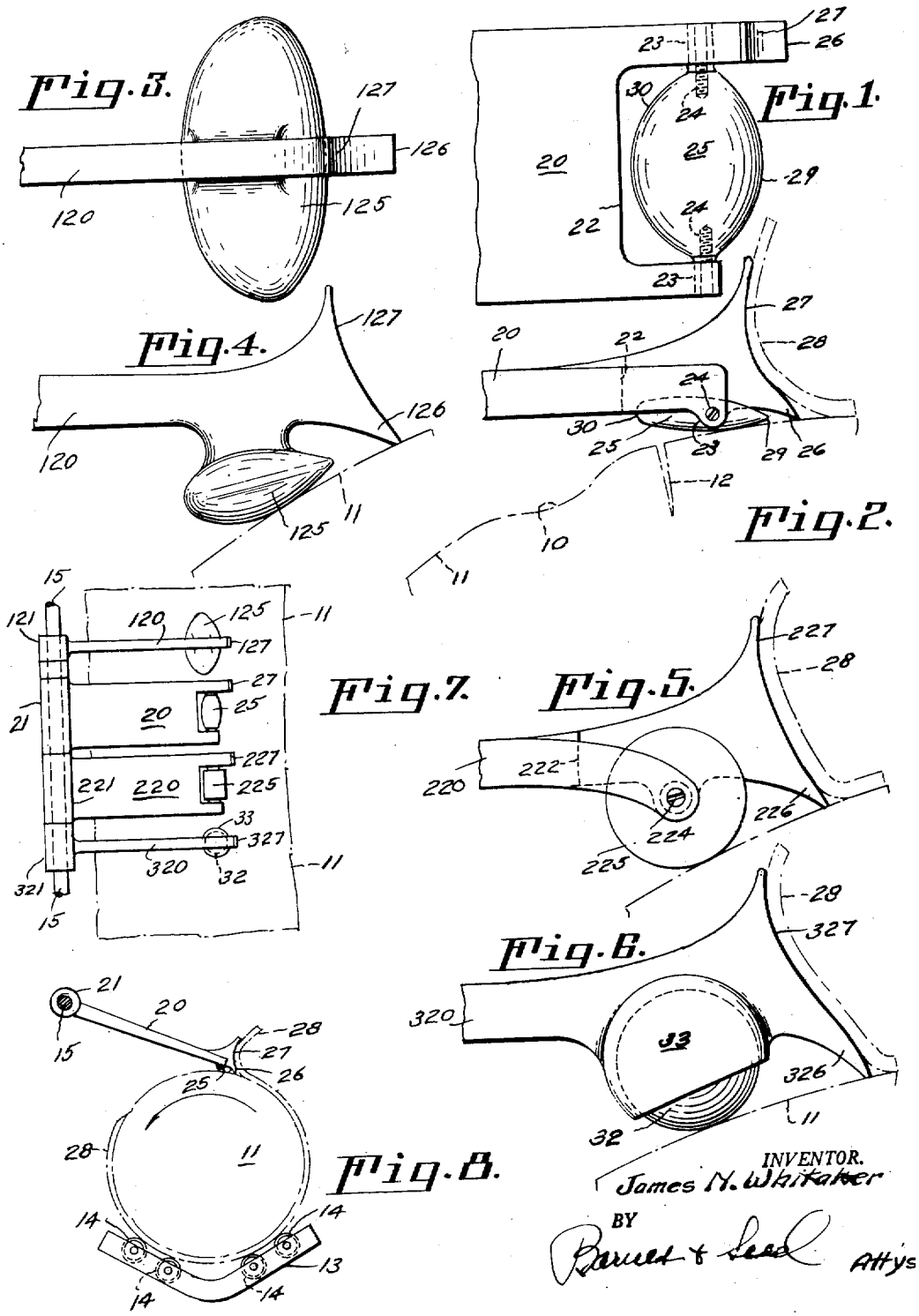
INVENTOR.
James N. Whitaker
BY
Barnes & Seal
Att'ys United States Patent Office Re. 24,215
Reissued Sept. 11, 1956

24,215

SWINGABLE REDWOOD-BARK-PEELING CHISEL HAVING PEELED-LOG-CONTACTING GUIDE

James N. Whitaker, Healdsburg, Calif.

Original No. 2,689,590, dated September 21, 1954, Serial No. 311,937, September 27, 1952. Application for reissue June 25, 1956, Serial No. 593,782

5 Claims. (Cl. 144—208)

Matter enclosed in heavy brackets [ ] appears in the original patent but forms no part of this reissue specification; matter printed in italics indicates the additions made by reissue.

My present invention relates to redwood bark peelers and more particularly to improved tools for removing bark from logs.

In the processing of redwood logs into lumber it is necessary to remove the bark before sawing into lumber sizes. This is because redwood logs often are of great diameter having bark twelve inches or more in thickness and due to the peculiar composition of the bark it acts like an abrasive on the saws; therefore, the preliminary step of first peeling the log is necessary.

Peeling of redwood logs is an arduous and expensive operation because of the hand labor involved; therefore, I have designed special tools for performing this step which I have set forth somewhat in diagrammatical form in the following description.

The principal object of my invention is to produce improved tools for peeling redwood logs.

Another object is to produce a bark peeling tool which may be positioned above a log which is rotated against the tool, a plurality of these tools being freely pivoted along the length of the log.

Another object attained in the use of such tools is a guide member which bears on the bare surface of the log following the lifting of the bark by an accompanying chisel-like plow portion which raises the bark and lifts it upwardly and away from the tool.

A still further object is a guide member which is shaped like a clam shell and pivoted at its ends on the tool structure permitting it to tilt when encountering flute-like portions of the log surface.

Other objects and novel features presented in my invention will be more apparent as the description of the device and its operation progresses.

In the drawings illustrating in more or less diagrammatic form:

Fig. 1 is a fragmental top plan view of the preferred form of the tool;

Fig. 2 is a fragmental front elevation of Fig. 1;

Fig. 3 is a fragmental top plan view of a modified form of tool;

Fig. 4 is a fragmental front elevation of Fig. 3;

Fig. 5 is a fragmental front elevation of a tool similar to that shown in Fig. 2 in which a roll member is substituted for the clam-shell shaped guide member;

Fig. 6 is a fragmental front elevation of a tool similar to that shown in Fig. 3 but using a universal ball guide member instead of the fixed clam-shell like member of Figs. 3 and 4;

Fig. 7 is a fragmentary top plan view of the position taken by these tools when in operation on a log which is indicated in dot-and-dash lines. For the purpose of conserving space the four types of tools are shown in this figure but in actual practice all of the tools may be of one type, and Fig. 8 is a front elevation of Fig. 7, but shows only the tool illustrated in Figures 1 and 2.

In all redwood logs of large diameters the periphery of the wood varies in contour resulting in vertical flutes as indicated at 10 on the surface of the log 11 of Fig. 2. Also cracks 12 may be found at intervals. These flutes, as indicated at 10, vary in size and depth both transversally and longitudinally and are not continuous throughout the length of the tree.

As previously stated my invention in the present application is directed to the tool and not the means for rotating the log, therefore I have indicated diagrammatically a cradle 13 having rolls 14 preferably of corrugated surface on which the log 11 is rotated.

Mounted on any convenient part of a superstructure, not shown, is a longitudinal shaft 15 on which the tools are swingable. This shaft 15 should be vertically adjustable so that it may be adjusted to suit the diameter of the log about to be peeled. The purpose of this adjustability is for the purpose of permitting the peeling tools to assume the proper angle with respect to the surface of the log.

As previously stated Figs. 1 and 2 show the preferred type of tool in which I provide an elongate and flat arm portion 20, the back end of which is provided with journal portion 21 swingable on the shaft 15. The front end of this tool is recessed at 22 providing a jaw-like opening having pin bosses 23 located on the under side and adapted to receive pins 24 threaded into a clam shell-shaped guide member 25. On one side of the tool the jaw portion extends out in a leading position beyond the guide member 25 and is provided with a chisel-like edge 26, the face of which curves upwardly at 27 providing a deflecting surface against which the raised bark 28 is deflected away from the tool when in the process of peeling the bark.

The clam shell member 25 is sharp on the front side, as indicated at 29, and blunt on the back side, as indicated at 30, the peeled-log-contacting surface of the member being spaced further from a longitudinal axis of the arm 20 than the chisel edge 26.

In operation, the sharp edge 26 of the chisel-like portion of the tool is kept in a desired position with respect to the wood surface of the log by the member 25 following the contour of the log and bridging cracks, such as 12, the tool rising and dropping on the shaft 15 as the log is rotated.

It should be kept in mind that while this tool is mainly provided to lift and remove the bark on the log it is immaterial whether or not here or there the surface of the wood gets shaved a bit. The wood surface of these redwood logs is very soft and fibrous and such extreme surface areas are waste in the form of slabs and edgings.

Figs. 3 and 4 show a modified form in which the arm portion 120 is narrow and has a chisel portion 126 and a bark deflecting face 127 similar to corresponding portions in Figs. 1 and 2. The clam shell portion 125 is similar to 25 in Figs. 1 and 2 but is fixed to the under side of portion 120. The operation is similar to the type shown in Figs. 1 and 2, with the exception of the fixed nature of the member 125.

In Fig. 5 the arm portion 220 is wide, as in Fig 1, the chisel edge 226, face 227, and jaw recess 222 being similar to corresponding portions shown in Figs. 1 and 2, the only real difference being in the substitution of the roll 225 for the clam shell member 25. The operation is similar.

In Fig. 6 the arm portion 320 is similar to that shown in Figs. 3 and 4, being of the narrow type. The chisel edge 326 and face 327 are similar to corresponding portions of Figs. 1 and 2. In this type a universal ball 32 is rotatably located in a housing 33 which is fixed to the under side of member 320. The operation is similar to the structure shown in Figs. 1 and 2.

In operation, in any one of the four types shown, the tools are swivelled at 21, 121, 221, or 321, depending on the type used, on the normally fixed rod 15, the chisel ends of the tools being in contact with the bark 28 of the log 11. The log 11 is rotated against the tools, as indicated by the arrow in Fig. 8. Each tool operates independently of the other, rising and falling as the contour of the log presents itself under the guide member of the tool until a complete revolution of the log has been made.

While I have shown my invention somewhat in diagrammatic form it is to be understood that I may vary the shape and proportion of the various portions within wide latitude and substitute equivalent structure well within the scope of the appended claims.

What I claim is:

1. An improved tool for peeling redwood logs comprising an elongated arm [freely] swiveled at one end on an axis transverse to a longitudinal axis of said arm, said arm and said transverse axis being [located above] *spaced outwardly from* a log rotatable on its longitudinal axis, said transverse axis lying substantially parallel to the longitudinal axis of said log, the free end of said elongate arm forming a bark removing plow [having a concave front face and] having a chisel edge spaced from a prolongation of the longitudinal axis of said arm, and engaging under the bark of said log, and a guide member mounted on said arm and located in following relation to said chisel edge, said guide member having a log-contacting surface which rides on the peeled surface of said log, and said log-contacting surface being spaced further from said prolongation of the longitudinal axis of said arm than said chisel edge.

2. An improved tool for peeling redwood logs, as set forth in claim 1, in which said guide member comprises a clam-shell-shaped member pivoted at its ends in a recess in the free end of said elongate arm.

3. An improved tool for peeling redwood logs, as set forth in claim 1, in which the guide member comprises a clam-shell-shaped member fixed to the underside of said elongate-arm.

4. An improved tool for peeling redwood logs, as set forth in claim 1, in which the guide member comprises a roll pivoted at each end in a recess formed in the free end of said elongate-arm and adjacent one side of said chisel edge.

5. An improved tool for peeling redwood logs, as set forth in claim 1, in which the guide member comprises a ball socket fixed to the [under side] *underside* of said elongate-arm, and a ball universally movable in said socket, and riding on the peeled surface of said log.

References Cited in the file of this patent or the original patent

UNITED STATES PATENTS

| | | |
|---|---|---|
| 988,860 | Carter | Apr. 4, 1911 |
| 2,637,357 | Johnson et al. | May 5, 1953 |
| 2,660,207 | Phillips | Nov. 24, 1953 |